US008832661B2

(12) United States Patent
Andrews

(10) Patent No.: US 8,832,661 B2
(45) Date of Patent: *Sep. 9, 2014

(54) INSTALLING AND TESTING AN APPLICATION ON A HIGHLY UTILIZED COMPUTER PLATFORM

(75) Inventor: David A. Andrews, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/467,370

(22) Filed: May 9, 2012

(65) Prior Publication Data

US 2012/0297366 A1 Nov. 22, 2012

(30) Foreign Application Priority Data

May 17, 2011 (EP) .................................. 11166351

(51) Int. Cl.
G06F 9/44 (2006.01)

(52) U.S. Cl.
USPC ......................................................... 717/124

(58) Field of Classification Search
None
See application file for complete search history.

(56) References Cited

U.S. PATENT DOCUMENTS

| | | | | |
|---|---|---|---|---|
| 5,854,823 | A * | 12/1998 | Badger et al. | 379/15.01 |
| 6,014,760 | A | 1/2000 | Silva et al. | |
| 7,062,753 | B1 * | 6/2006 | Ward et al. | 717/124 |
| 7,337,429 | B1 | 2/2008 | Psaras et al. | |
| 7,735,080 | B2 | 6/2010 | Barturen et al. | |
| 7,950,007 | B2 | 5/2011 | Mohindra et al. | |
| 2003/0046681 | A1 | 3/2003 | Barturen et al. | |
| 2004/0010592 | A1 * | 1/2004 | Carver et al. | 709/226 |
| 2005/0055595 | A1 | 3/2005 | Frazer et al. | |
| 2006/0212869 | A1 * | 9/2006 | Bril et al. | 718/102 |
| 2007/0245341 | A1 | 10/2007 | Wang et al. | |
| 2007/0294420 | A1 | 12/2007 | Mohindra et al. | |
| 2009/0187899 | A1 * | 7/2009 | Mani et al. | 717/168 |
| 2011/0173637 | A1 * | 7/2011 | Brandwine et al. | 719/314 |
| 2012/0072762 | A1 * | 3/2012 | Atchison et al. | 714/2 |

FOREIGN PATENT DOCUMENTS

| | | |
|---|---|---|
| WO | WO0116753 A2 | 3/2001 |
| WO | WO 03/009136 A1 | 1/2003 |

OTHER PUBLICATIONS

GB Search Report and Examination Report dated Aug. 10, 2012 regarding application GB1208249.1, applicant International Business Machines Corporation, 7 pages.

Andrews, "Installing and Testing an Application on a Highly Utilized Computer Platform," U.S. Appl. No. 13/616,240, filed Sep. 14, 2012, 33 pages.

(Continued)

*Primary Examiner* — Philip Wang

(74) *Attorney, Agent, or Firm* — Yee & Associates, P.C.; David A. Mims, Jr.

(57) ABSTRACT

A method, apparatus and computer product for installing and testing an application on a highly utilized computer platform comprising: determining spare computing capacity of the computer platform over a utilization period; determining workload capacity required by the computer platform for installing the computer application and performing one or more diagnostic tests on the installed computer application; and scheduling deployment and performance of the one or more diagnostic tests to avoid periods where there is low computing capacity based on a predicted recurrence of the spare computing capacity over a similar future utilization period whereby the scheduling aims to provide sufficient system capacity for running an accumulated extra workload of the new application and the additional diagnostic tests required to verify the deployment of the one or more diagnostic tests.

9 Claims, 14 Drawing Sheets

(56) References Cited

OTHER PUBLICATIONS

Audris Mockus et al., "Predicting Risk of Software Changes", http://onlinelibrary.wiley.com/doi/10.1002/bltj.2229/abstract, Aug. 28, 2002, Abstract, pp. 1-2.

D. E. Cox et al., "Management of the Service-Oriented-Architecture Life Cycle", http://ieeexplore.ieee.org/xpl/freeabs_all.jsp?arnumber=5386697, IBM Systems Journal Issue, Published in 2005, Abstract, pp. 1.

Smith et al., "Predicting Application Run Times using Historical Information", http://www.springerlink.com/content/60p16r7g83324487/, Job Scheduling Strategies for Parallel Processing Lecture Notes in Computer Science, Published in 2008, Abstract, pp. 1-2.

Non-final office action dated Oct. 23, 2013 regarding U.S. Appl. No. 13/616,240, 11 pages.

* cited by examiner

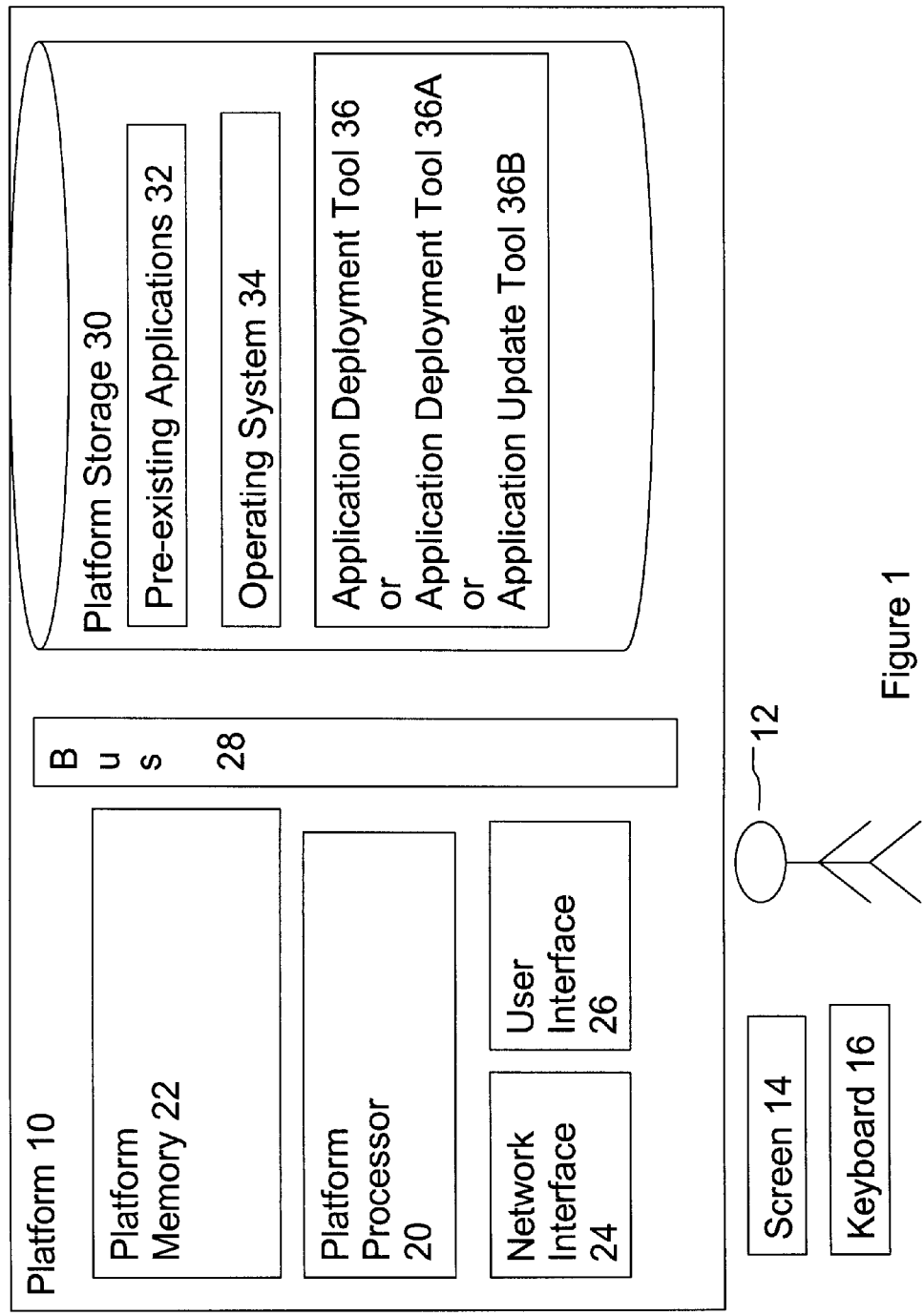

| Platform Capacity Data 216. Billion Instructions/sec (BI/S) | | |
|---|---|---|
| Day 23 | | |
| Hour | Use (BI/S) | Available Capacity (BI/S) |
| 0 | 4 | 5 |
| 2 | 3 | 6 |
| 4 | 2 | 7 |
| 6 | 3 | 6 |
| 8 | 4 | 5 |
| 10 | 5 | 4 |
| 12 | 6 | 3 |
| 14 | 7 | 2 |
| 16 | 8 | 1 |
| 18 | 9 | 0 |
| 20 | 9 | 0 |
| 22 | 8 | 1 |

Figure 5

| Application Metadata 220 | | | | |
|---|---|---|---|---|
| | Install Bandwidth (BI/S) | Install Time (Hours) | Exe Bandwidth (BI/S) | Exe Time (Hours) | Size (gigabyte) |
| App 218 | 0.5 | 2 | 1 | 24 | 10 |

Figure 6

| Test Metadata 224 | Install Bandwidth (BI/S) | Install Time (Hours) | Exe Bandwidth (BI/S) | Exe Time (Hours) | Size (gigabyte) | Priority |
|---|---|---|---|---|---|---|
| Test 222A | 0.5 | 0.5 | 1 | 4 | 0.5 | 1 |
| Test 222B | 0.5 | 0.5 | 1 | 2 | 0.5 | 1 |
| Test 222C | 0.5 | 1 | 2 | 1 | 2 | 2 |

Figure 7

| Platform Capacity Data 216 | | Schedule data 226 | | | |
|---|---|---|---|---|---|
| | | Total Scheduled Bandwidth (Bl/S) | Scheduled deployment and execution bands | | |
| Hour | Estimated Capacity (Bl/S) | | 81 | 82 | 83 |
| 0 | 5 | - | - | | |
| 2 | 6 | - | - | | |
| 4 | 7 | - | - | - | |
| 6 | 6 | - | - | - | |
| 8 | 5 | - | - | - | |
| 10 | 4 | - | - | - | - |
| 12 | 3 | - | - | - | - |
| 14 | 2 | - | - | - | - |
| 16 | 1 | - | - | - | - |
| 18 | 0 | - | | - | - |
| 20 | 0 | - | | - | - |
| 22 | 1 | - | | | - |

Figure 8A

| Platform Capacity Data 216 | | Schedule data 226 | | | |
|---|---|---|---|---|---|
| | | Total Scheduled Bandwidth (BI/S) | Scheduled deployment and execution bands | | |
| Hour | Estimated Capacity (BI/S) | | 81 | 82 | 83 |
| 0 | 5 | - | 2 (Deploy App 220) | - | |
| 2 | 6 | - | 2 | - | |
| 4 | 7 | - | - | - | |
| 6 | 6 | - | - | - | |
| 8 | 5 | - | - | - | |
| 10 | 4 | - | - | - | |
| 12 | 3 | - | - | - | |
| 14 | 2 | - | - | - | |
| 16 | 1 | - | - | - | |
| 18 | 0 | - | - | | |
| 20 | 0 | - | | | |
| 22 | 1 | - | | | |

Figure 8B

| Platform Capacity Data 216 | | Schedule data 226 | | | |
|---|---|---|---|---|---|
| | | Total Scheduled Bandwidth (Bl/S) | Scheduled deployment and execution bands | | |
| | | | 81 | 82 | 83 |
| Hour | Estimated Capacity (Bl/S) | | 2 (Deploy App 220) | 1 (Deploy Test 222A) | 1 (Deploy Test 222B) |
| 0 | 5 | 4 | 2 | 1 | 1 |
| 2 | 6 | 3 | - | - | 0 |
| 4 | 7 | - | - | - | - |
| 6 | 6 | - | - | - | - |
| 8 | 5 | - | - | - | - |
| 10 | 4 | - | - | - | - |
| 12 | 3 | - | - | - | - |
| 14 | 2 | - | - | - | - |
| 16 | 1 | - | - | - | - |
| 18 | 0 | - | - | - | - |
| 20 | 0 | - | - | - | - |
| 22 | 1 | - | - | - | - |

Figure 8C

| Platform Capacity Data 216 | | Schedule data 226 | | | |
|---|---|---|---|---|---|
| | | Total Scheduled Bandwidth (BI/S) | Scheduled deployment and execution bands | | |
| Hour | Estimated Capacity (BI/S) | | 81 | 82 | 83 |
| | | | 2 (Deploy App 220) | 1 (Deploy Test 222A) | 1 (Deploy Test 222B) |
| 0 | 5 | 4 | 2 | 1 | 1 |
| 2 | 6 | 3 | 2 | | 0 |
| 4 | 7 | - | 2 (Exe App 220) | - | - |
| 6 | 6 | - | 2 | - | - |
| 8 | 5 | - | 2 | - | - |
| 10 | 4 | - | 2 | - | - |
| 12 | 3 | - | 2 | - | - |
| 14 | 2 | - | - | - | - |
| 16 | 1 | - | - | - | - |
| 18 | 0 | - | - | - | - |
| 20 | 0 | - | - | - | - |
| 22 | 1 | - | - | - | - |

Figure 8D

| Platform Capacity Data 216 | Schedule data 226 | | | |
|---|---|---|---|---|
| | Total Scheduled Bandwidth (BI/S) | Scheduled deployment and execution bands | | |
| Hour | Estimated Capacity (BI/S) | | | |
| | | 81 | 82 | 83 |
| 0 | 5 | 4 | 2 (Deploy App 220) | 1 (Deploy Test 222A) | 1 (Deploy Test 222B) |
| 2 | 6 | 3 | 2 | 1 | 0 |
| 4 | 7 | 6 | 2 (Exe App 220) | 2 (Exe Test 222A) | 2 (Exe Test 222B) |
| 6 | 6 | 6 | 2 | 2 | 2 |
| 8 | 5 | 4 | 2 | 2 | - |
| 10 | 4 | - | 2 | - | - |
| 12 | 3 | - | 2 | - | - |
| 14 | 2 | - | - | - | - |
| 16 | 1 | - | - | - | - |
| 18 | 0 | - | - | - | - |
| 20 | 0 | - | - | - | - |
| 22 | 1 | - | - | - | - |

Figure 8E

| Platform Capacity Data 216 | | Schedule data 226 | | | |
|---|---|---|---|---|---|
| | | Total Scheduled Bandwidth (BI/S) | Scheduled deployment and execution bands | | |
| Hour | Estimated Capacity (BI/S) | | 81 | 82 | 83 |
| 0 | 5 | 4 | 2 (Deploy App 220) | 1 (Deploy Test 222A) | 1 (Deploy Test 222B) |
| 2 | 6 | 3 | 2 | 1 | 0 |
| 4 | 7 | 6 | 2 (Exe App 220) | 2 (Exe Test 222A) | 2 (Exe Test 222B) |
| 6 | 6 | 6 | 2 | 2 | 2 |
| 8 | 5 | 5 | 2 | 2 | 1 (Deploy Test 222C) |
| 10 | 4 | 3 | 2 | - | 1 (Exe Test 222C) |
| 12 | 3 | 3 | 2 | - | 1 |
| 14 | 2 | 2 | - | - | - |
| 16 | 1 | - | - | - | - |
| 18 | 0 | - | - | - | - |
| 20 | 0 | - | - | - | - |
| 22 | 1 | - | - | - | - |

Figure 8F

INSTALLING AND TESTING AN APPLICATION ON A HIGHLY UTILIZED COMPUTER PLATFORM

This invention relates to a method and apparatus for installing and testing an application on a highly utilized computer platform.

BACKGROUND

Introducing a new application or a change to an application into a heavily loaded production computer platform is risky when a full test cannot be performed. Generally a human administrator decides when best to deploy an application and so adds human error to the overall risk of the new application failing. Furthermore a human operator may also make configurations for the application and so adds further risk of human error.

US patent publication 2007/0294420 discloses a computer implemented method for optimizing installation of an application on a computer. Resources and services affected by a change to a resource are identified in response to receiving a request for the change. A determination of an optimal time for the change is made based on a policy associated with the service. The change is deployed with a deployment engine. A determination is made by approximating how long is needed to implement the change and feedback from other similar changes is used to better determine how much time is required to make the change. Next, the change management coordinator determines the best time to apply the requested change based on the policy for the high-level service. This method does not test that the application is installed correctly or that it functions correctly after installation.

It is desirable to automate aspects of both the deployment and the testing of an application in a production platform to reduce the risk of outages to a production platform caused by application and human errors. It is further desirable to provide full diagnostics to speed up fixing defects if they were to occur.

SUMMARY OF INVENTION

In a first aspect of the invention there is provided a method as described in any of claims 1 to 8.

The preferred embodiment is an application deployment tool that uses historical data to determine the best time to deploy and test application changes in a production platform. The deployment tool deploys and turns on diagnostics by selecting times when the load on the production platform is low. Selecting times when the platform load is low allows diagnostics to be turned on without impacting overall performance. Furthermore if a new application does fail, the failure can be resolved faster than would be the case without diagnostics.

Workload and central processor unit (CPU) usage in a production computer platform often follow a regular pattern. Often a computer platform is busiest during peak periods in the day and quieter at night. The preferred embodiment of the invention relies on the computer platform to maintain a log of system resources (for example, CPU and memory usage) over a specified period (for example, one week).

The preferred embodiment describes a new automated deployment capability. It takes responsibility for deploying application changes to a production platform away from a human being and replaces it with an enhanced deployment tool. The deployment tool predicts the best time for the platform to be available to introduce a new or changed application and it can predict how busy the platform will be at that time.

At the appropriate time, the deployment tool will turn on and start collecting additional diagnostic information on the production platform (for example, application and system tracing, performance measuring). The degree of additional diagnostics that will be turned on will be based on predicted platform resource levels. Existing application and workload running on the production platform will not be affected by the additional diagnostics as the deployment tool will have determined there was spare and unused capacity at that time.

The deployment tool will deploy the new or changed application into the production platform. If there are any problems discovered it will be simpler and quicker to debug because of the extended diagnostics that are available.

After a set period or based on monitoring the system usage or using the system log data, the deployment tool will turn off the extended diagnostic collection and the extended production testing process will end.

An optional enhancement for the case of changed applications is for the deployment tool to copy the existing production version of the application and store it while the modified application is tested. The original application copy could be re-instated automatically if a problem occurs.

The present embodiment covers the case for deployment of new applications into a production system. Something similar can be produced to help with configuration changes to production systems; for example, performance tuning, maintenance, and configuration changes. The principle is that the tool chooses the best time when there are resources available so that enhanced diagnostics can be turned on to aid debugging or problem resolution.

In a second aspect of the invention there is provided a system as described in any of claims 9 to 15.

In a third aspect of the invention there is provided a computer program product as described in claim 16.

In a fourth aspect of the invention there is provided a computer program as described in claim 17.

DESCRIPTION OF DRAWINGS

Embodiments of the invention will now be described, by means of example only, with reference to the accompanying drawings in which:

FIG. 1 is a deployment diagram of an platform and application deployment tool of the prior art or a tool of the one of the embodiments;

FIG. 5 is an example of platform capacity data;

FIG. 6 is an example of application metadata corresponding to the example of FIG. 5;

FIG. 7 is an example of test metadata corresponding to the examples of FIGS. 5 and 6; and FIGS. 8A to 8F show a sequence of scheduling states of example schedule data corresponding to the examples of FIGS. 5, 6 and 7.

DESCRIPTION OF THE EMBODIMENTS

Figure 2A:
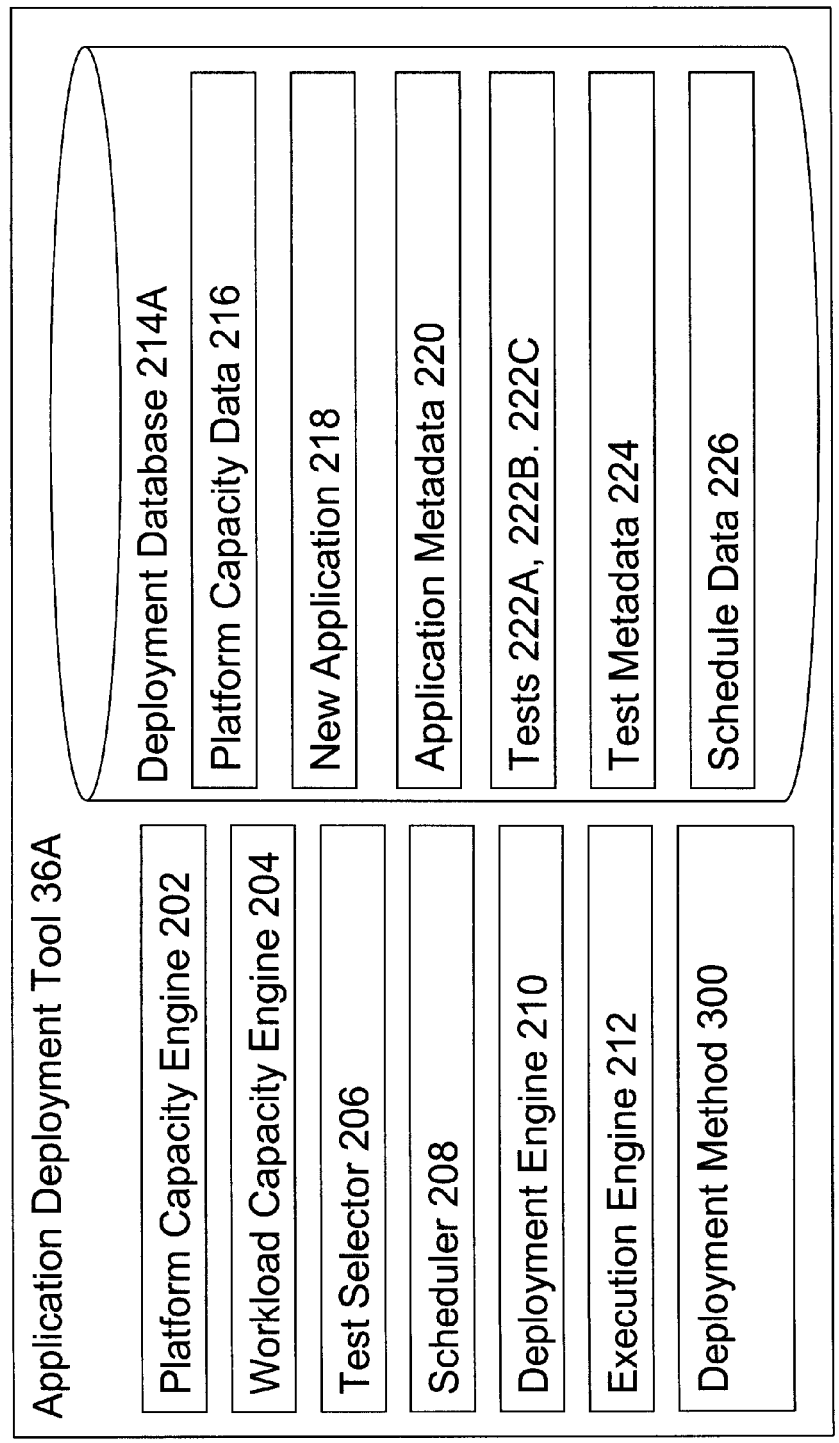
FIG. 2A is a component diagram of an application deployment tool of the preferred embodiment.

Referring to FIG. 1, there is shown a deployment diagram of platform 10 for interaction with user 12 using screen 14 and keyboard 16. Platform 10 comprises: platform processor 20; platform memory 22; network interface 24; platform user interface 26; bus 28 and platform storage 30. An example of platform 10 is an IBM* POWER* 750 Express* server.

Processor 20 takes instructions and data from platform memory 22 for performing logical operations on data according to the instructions. Examples of instructions include add data, subtract data, read data, write data. An example of a processor is an IBM POWER7* processor. Examples of operating systems that run on an IBM Power7 are IBM AIX* and Linux*.

Platform memory 22, faster than platform storage 30, is designed for fast access so that it does not limit processor speed. In operation processor accesses and executes code stored in platform memory 22. An example of the code is program 32. An example of execution memory is 8 gigabyte to 512 gigabyte registered dual in-line memory modules (RDIMM) comprising a series of dynamic random access memory (DRAM) integrated circuits.

Network interface 24 is for communicating with other platforms connected to platform 10 on a network, for example, a local area network (LAN) or the Internet. Typically such communications are service calls when platform 10 will request another network device to provide a service such as performing an operation on supplied data.

Platform user interface 26 is for receiving input from user 12 via keyboard 16, mouse or other human input device. It is also for sending output to user 12 via screen 14, speakers or other human output device.

Bus 28 provides the communication paths for instructions and data between processor 20, platform memory 22, network interface 24, platform user interface 26 and platform storage 30. Storage memory 30 is slower than working memory 22 but is designed to hold much more data. An example of storage memory is an 8 terabyte disk drive. When the platform is not operating then platform memory 22 is empty; platform storage 30 stores both execution code for upload to working memory and data for use with the execution code. The execution code of the preferred embodiment comprises; pre-existing applications 32; operating system 34 and configuration tool 36.

Pre-existing applications 32 can be any programs that interact with a user using the standard operating system 34 methods for input and output. Available processing capacity of the platform is determined by the number and type of pre-existing applications executing on the platform 10.

Operating system library 34 is for providing basic platform operating functions such as file storage and input/output.

Application deployment tool 36 is a prior art tool such as described in the background section prior art publication.

Application deployment tool 36A is a preferred embodiment of the present invention.

Application update tool 36B is an alternate embodiment of the present invention.

Referring to FIG. 2A, application deployment tool 36A of the preferred embodiment comprises: platform capacity engine 202; workload capacity engine 204; test selector 206; scheduler 208; deployment engine 210; execution engine 212; deployment database 214A and deployment method 300. Deployment database 214A comprises: platform capacity data 216; new application 218; new application metadata 220; tests 222 (for example 222A to 222C); test metadata 224 and schedule data 226.

Platform capacity engine 202 takes input from platform 10 and in particular processor 20 for logging processor usage data over time. Processor usage data is stored in deployment database 214A as platform capacity data 216. In the embodiments, the actual number of instructions processed per second is logged regularly and associated with the capacity of instructions that could be processed per second by the platform; this is the primary measurement of capacity. For example, the maximum capacity of the platform could be, say, nine billion instructions per second. If four billion instructions are processed per second on average in the two hour interval that leaves a five billion instruction per second capacity. See example platform capacity data 216 in FIG. 5. In the preferred embodiment, processing capacity is the primary measurement for capacity determination and comparison. However, in alternate embodiments a secondary measurement or combination of primary and secondary measurements could be used. An example of a secondary measurement for platform usage is an amount of platform memory 22 used over time in bytes associated with the total amount of platform memory available.

Workload capacity engine 204 is for providing bandwidth and time estimates for installation and execution of: an application; an update; and tests. The installation time estimate is based on the respective size of the application, update, and tests and the bandwidth estimate is based on that required by an installation mechanism. Execution bandwidth and execution time estimates are logged on prior execution or supplied as part of the application metadata 220 or test metadata 224. All bandwidth and time estimates are stored as part of application metadata 220 and test metadata 224 (for examples see FIGS. 6 and 7).

Test selector 206 is for selecting one or more tests 222 for scheduling after the deployment of the new application 220 or the update 240. Selection is made based on test metadata 224 given the expected processing bandwidth in the scheduled deployment period. Test metadata 224 includes test bandwidth; test duration and test priority.

Scheduler 208 is for scheduling deployment of an application together with subsequent deployment and execution of associated diagnostic tests in a period of time where the platform is expected to have capacity to achieve the deployment and testing. Scheduler 208 assumes an available capacity for a period of time in the future that is similar to the platform capacity data 216 that has been logged. Scheduler 208 compares the predicted platform capacity for a future period to determine a time when a new application and diagnostic workload can be performed.

Deployment engine 210 is for deploying the new application 218 at the scheduled time. Deployment engine 210 also deploys the tests 222 at a scheduled time after (or before) the new application 220 is deployed.

Execution engine 212 is for executing the deployed application and tests at a scheduled time.

Figure 2B:
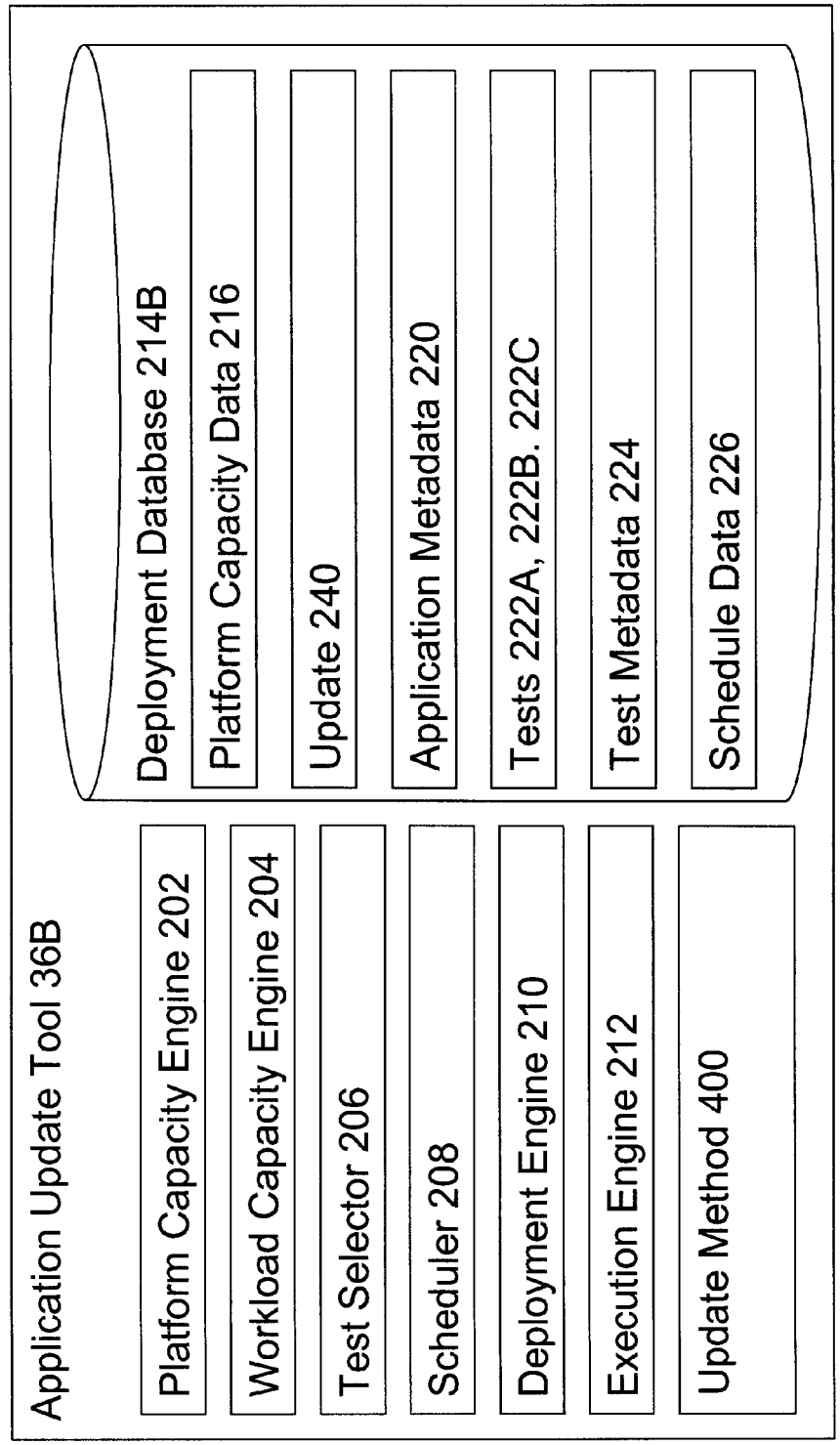
FIG. 2B is a component diagram of an application update tool of an alternate embodiment.

Referring to FIG. 2B, application update tool 36B is an alternate embodiment of the invention for configuring a platform for deployment of one or more updates to a pre-existing application 32. Whereas application deployment tool 36A of the preferred embodiment is for configuring a platform for deployment of new application 218.

The important differences of application update tool 36B (FIG. 2B) over application deployment tool 36A (FIG. 2A) are that an update method 400 replaces deployment method 300 and deployment database 214B comprises update data 240 instead of new application 218. Other components are similar in both embodiments except that the component will handle either an application 218 or an update 240.

Figure 3:
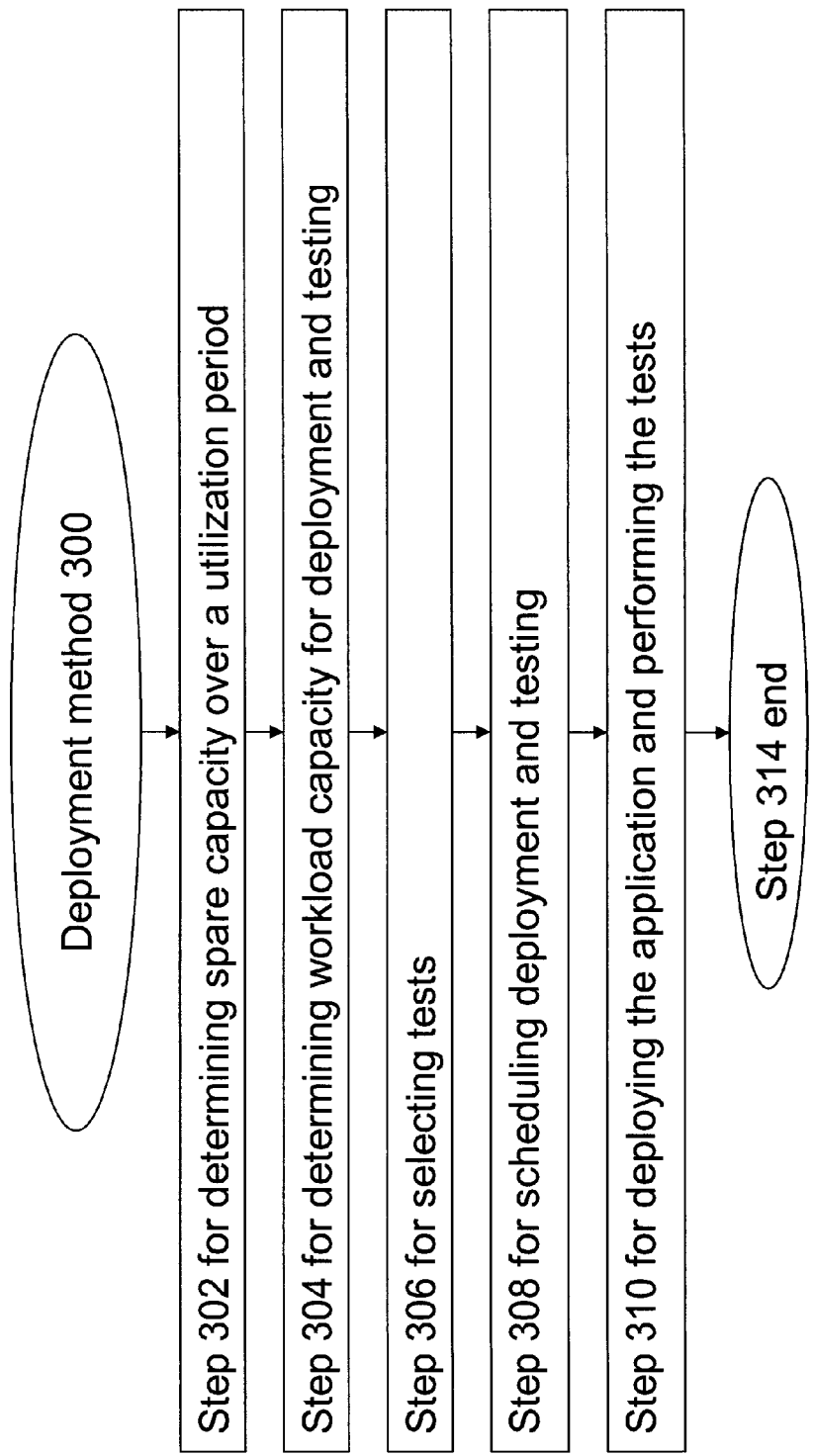
FIG. 3 is a flow diagram of the process of the preferred embodiment.

Deployment method 300 of the present embodiment of the invention comprises logical process steps 302 to 314 as described with reference to FIG. 3.

Step 302 is for determining spare capacity of said computer platform over a utilization period.

Step 304 is for determining workload capacity required by said computer platform for installing an application and for performing one or more diagnostic tests on the installed application.

Step 306 is for selecting said scheduled diagnostic tests from a set of prioritized diagnostic tests that may be performed on said application, said selection performed according to the highest priority tests that can be performed within the predicted capacity. Step 306 is a secondary feature of the preferred embodiment.

Step 308 is for scheduling deployment and performance of said one or more diagnostic tests to avoid periods where there is no computing capacity based on a predicted recurrence of the spare computing capacity over a similar future utilization period. Scheduling aims to provide sufficient system capacity for running the accumulated extra workload of the new application and the additional diagnostic tests required to verify the deployment. A secondary feature of the preferred embodiment comprises scheduling the remaining diagnostic tests, which are not initially selected at step 306, in the set for times when the predicted capacity of the computing platform allows.

Step 310 is for deploying the application and performing diagnostic tests at said scheduled time. The preferred embodiment comprises comparing the predicted computing capacity and the actual computing capacity and aborting deployment and/or testing if the actual computing capacity is not within a safe tolerance of the predicted capacity. Optionally additional diagnostic tests are performed at the scheduled time if the actual capacity is more than the predicted capacity or wherein fewer diagnostic tests are performed at the scheduled time if the actual capacity is less than the predicted capacity.

Figure 4:
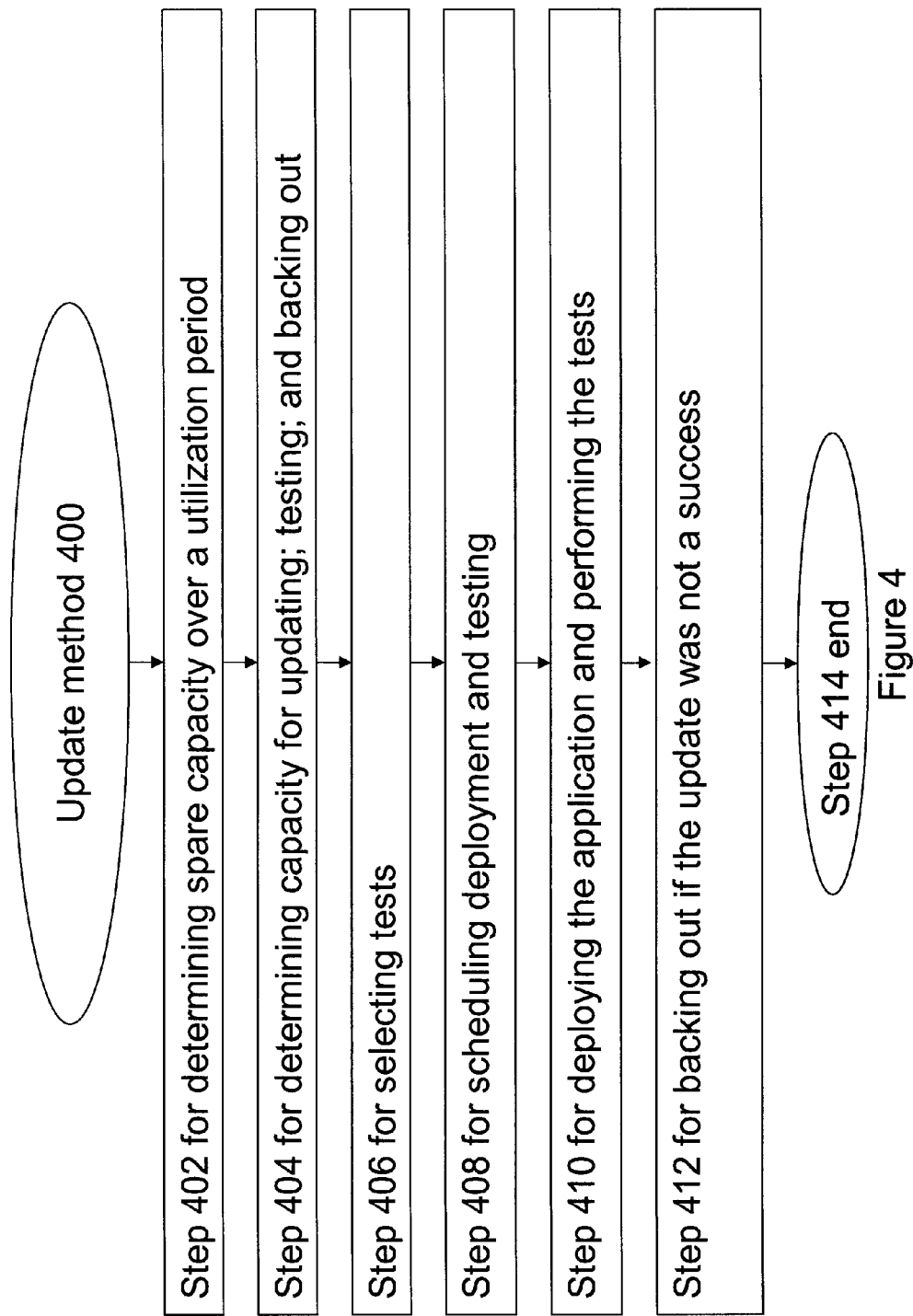
FIG. 4 is a flow diagram of the process of the alternate embodiment.

Update method 400 of the second embodiment of the invention comprises logical process steps 402 to 414 as described with reference to FIG. 4.

Step 402 is for determining spare capacity of said computer platform over a utilization period.

Step 404 is for determining workload capacity required by said computer platform for the following tasks: installing an update to a pre-existing application; performing one or more diagnostic tests for determining if the update is a success; and for returning the application to its pre-existing state if a diagnostic test showed that the update had failed.

Step 406 is for selecting said scheduled diagnostic tests from a set of prioritized diagnostic tests that may be performed on said application, said selection performed according to the highest priority tests that can be performed within the predicted capacity. Step 406 is a secondary feature of the alternate embodiment.

Step 408 is for scheduling deployment and performance of said one or more diagnostic tests to avoid periods where there is no spare computing capacity. Computing capacity assumptions are based on a predicted recurrence of the spare computing capacity over a similar future utilization period (for example the same day a week later). Scheduling aims to provide sufficient system capacity for running the accumulated extra workload of the new application and the additional diagnostic tests required to verify the deployment. A secondary feature of the alternate embodiment comprises scheduling the remaining diagnostic tests, tests that are not initially selected at step 406, for times when the predicted capacity of the computing platform allows.

Step 410 is for deploying the application and performing diagnostic tests at said scheduled time. The method of the alternate embodiment comprises comparing the predicted computing capacity and the actual computing capacity and aborting deployment and/or testing if the actual computing capacity is not within a safe tolerance of the predicted capacity. Optionally additional diagnostic tests are performed at the scheduled time if the actual capacity is more than the predicted capacity or wherein fewer diagnostic tests are performed at the scheduled time if the actual capacity is less than the predicted capacity.

Step 412 is for returning the application to its pre-existing state if the update was not a success as determined by the update test.

Step 414 is the end of the updating method 400.

Referring to FIGS. 5, 6, 7 and 8A to 8F, an example of the operation of the preferred embodiment is described.

Referring to FIG. 5, platform capacity data 216 comprises a table of records logging the platform use and capacity over a period of day (day 23) in two hour increments. The use and available capacity are measured in billion instructions per second (BI/S). The record for zero hour shows that the platform is using 4 BI/S and has a further capacity of 5 BI/S; in this example, the total capacity of the platform is a constant 9 BI/S over the course of a day; for simplicity the example has predicted a constant total capacity but the claims would cover an example of a resource having variable capacity. This example shows that use of the resource is at a minimum use of 2 BI/S (maximum capacity of 7 BI/S) at hour 4 and the increases to a maximum use of 9 BI/S (no capacity) in hour 18 and hour 20.

Referring to FIG. 6, example application metadata 220 is shown. Application metadata 220 comprises a record for application 218 comprising: 0.5 BI/S install bandwidth; 2 hour install time; 1 B/IS execution bandwidth; 24 hours execution time; and 10 gigabyte size.

Referring to FIG. 7, example test metadata 224 is a table comprising records for test 222A; test 222B and test 222C. Test 222A has 0.5 BI/S install bandwidth; 0.5 hour install time; 1 BI/S execution bandwidth; 4 hour execution time; 0.5 gigabyte size; and 1 priority. Tests have the same 0.5 BI/S install bandwidth as application 218 because they are installed by the same mechanism; however, the install time varies because of different respective sizes. Application 218 at 10 gigabyte requires 2 hours installation whereas test 222C requires 1 hour; and 222A, 222B both require 0.5 hours each. Execution bandwidth of the tests 222A and 222B is the same as the application 218 but test 222C requires twice the bandwidth at 2 BI/S. Application 218 requires 24 hours of execution, test 222A require 4 hours; test 222B requires 2 hours and test 222C requires 1 hour. Tests 222A and 222B have the highest priority of one while test 222C has a lower priority of two.

FIGS. 8A to 8F show a sequence of scheduling states of example schedule data corresponding to the examples of FIGS. 5, 6 and 7. Scheduler 208 uses platform capacity data 216 to build scheduling data using the same time intervals and estimated capacity in each of the time intervals. The time intervals (every 2 hours) and estimated capacity are the first two columns in each of FIGS. 8A to 8F; each schedule data 226 row corresponds with these rows for platform capacity data 216.

Referring to FIG. 8A, example schedule data 226 is empty. The first column of schedule 226 is the total scheduled bandwidth; since there is no scheduled deployment in FIG. 8A there is zero scheduled bandwidth. Scheduler 208 examines the estimated capacity data and looks for peak capacity (in the example it is hour 4 with 7 BI/S). Peak capacity is the best time for the new application and tests to run. In this example, three scheduled deployment and execution bands 81, 82 and 83 are shown as parallel scheduling bands but more or fewer bands can be used for different examples.

Referring to FIG. 8B, scheduler 208 has scheduled the four hour deployment of application 220 in band 81 at hour 0 and hour 2 so that it is deployed before the peak capacity of the platform.

Referring to FIG. 8C, scheduler 208 has then scheduled the deployment of test 222A in band 82 and test 222B in band 83. At hour 0, deployment of application 220 requires 2 BI/S; and deployment of tests 222A and 222B require 1 BI/S each. At hour 0, the total scheduled bandwidth is 4 BI/S which is 1 BI/S less than the estimated capacity of 5 BI/S. At hour 2, deployment of application 220 requires 2 BI/S; deployment of test 222A require 1 BI/S and test 222B has finished deploying; and the total scheduled bandwidth is 3 BI/S which is 3 BI/S less than the estimated capacity of 6 BI/S.

Referring to FIG. 8D, scheduler 208 has scheduled the execution of application 220 in band 81 at hour 4. Execution continues until hour 16.

Referring to FIG. 8E, scheduler 208 has scheduled the execution of test 222A in band 82 and execution of test 222B in band 83 at hour 4. Execution of test 222A lasts for 6 hours until hour 10 and execution of test 222B lasts for 4 hours until hour 8. At hour 4 and 6, execution of application 220 requires 2 BI/S; execution of tests 222A and 222B require 2 BI/S each; and the total scheduled bandwidth is 6 BI/S. The total scheduled bandwidth is just less than the estimated capacity of 7 BI/S at hour 4.

Referring to FIG. 8F, scheduler 208 has scheduled the deployment and execution of test 222C in band 83 at hour 5 after test 222B has finished. Deployment and execution of test 222C lasts for 8 hours. At hour 8, execution of application 220 requires 2 BI/S; execution of test 222A requires 2 BI/S; deployment of test 222C requires 1 BI/S; therefore the total scheduled bandwidth is 5 BI/S; and the same as the estimated capacity. At hour 10, execution of application 220 requires 2 BI/S; execution of test 222C requires 1 BI/S; therefore the total scheduled bandwidth is 3 BI/S; and 1 BI/S less than the estimated capacity. At hour 12, the total scheduled bandwidth is 3 BI/S and the same as the estimated capacity. At hour 14, the total scheduled bandwidth is 2 BI/S and the same as the estimated capacity.

Further embodiments of the invention are now described.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause the computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

Notices

IBM, the IBM logo, ibm.com, Express, Power and Power7 are trademarks or registered trademarks of International Business Machines Corporation in the United States, other countries or both. A full list of U.S. trademarks owned by IBM may be found at: www.ibm.com/legal/copytrade.shtml.

The invention claimed is:

1. A system for installing and testing a computer application on a computer platform, the system comprising a data processor coupled to a memory that includes instructions that are executable by the data processor to perform steps of:

determining spare computing capacity of said computer platform over a utilization period;

determining workload capacity required by said computer platform for installing the computer application and performing at least one diagnostic tests on the installed computer application; and scheduling deployment and performance of said at least one diagnostic test to avoid periods where there is low computing capacity based on a predicted recurrence of the spare computing capacity over a similar future utilization period whereby said scheduling is adapted to provide sufficient system capacity for running an accumulated extra workload of the new application and the additional diagnostic tests required to verify the deployment of said one or more diagnostic tests.

2. A system according to claim 1 further comprising selecting said at least one scheduled diagnostic test from a set of prioritized diagnostic tests that may be performed on said computer application, said selection being performed according to highest priority tests that can be performed within the predicted capacity.

3. A system according to claim 2 further comprising scheduling the remaining diagnostic tests in the set for times when the predicted capacity of the computing platform allows.

4. A system according to claim 1 further comprising deploying the computer application and performing said at least one diagnostic test at said scheduled time.

5. A system according to claim 4 further comprising comparing the predicted computing capacity and the actual computing capacity and aborting deployment and testing if the actual computing capacity is not within a safe tolerance of the predicted capacity.

6. A system according to claim 5 further comprising performing additional diagnostic tests at the scheduled time if the actual capacity is more than the predicted capacity and performing fewer diagnostic tests at the scheduled time if the actual capacity is less than the predicted capacity.

7. A system according to claim 1 wherein the computer application is an update to a pre-existing computer application, and further comprising performing the at least one diagnostic test comprises performing the at least one diagnostic test to determine if the update is a success, and returning the computer application to its pre-existing state if a diagnostic test of the at least one diagnostic test shows that the update has failed.

8. A computer program product comprising a non-transitory computer readable medium having computer readable code stored thereon for installing and testing a computer application on a computer platform, said computer readable code which when loaded onto a computer system and executed performs steps of:

determining spare computing capacity of said computer platform over a utilization period;

determining workload capacity required by said computer platform for installing the computer application and performing at least one diagnostic tests on the installed computer application; and scheduling deployment and performance of said at least one diagnostic test to avoid periods where there is low computing capacity based on a predicted recurrence of the spare computing capacity over a similar future utilization period whereby said scheduling is adapted to provide sufficient system capacity for running an accumulated extra workload of the new application and the additional diagnostic tests required to verify the deployment of said one or more diagnostic tests.

9. A computer program stored on a non-transitory computer readable medium and loadable into an internal memory of a computer for performing, when said computer program is run on the computer, steps of:

determining spare computing capacity of said computer platform over a utilization period;

determining workload capacity required by said computer platform for installing the computer application and performing at least one diagnostic tests on the installed computer application; and scheduling deployment and performance of said at least one diagnostic test to avoid period where there is low computing capacity based on a predicted recurrence of the spare computing capacity over a similar future utilization period whereby said scheduling is adapted to provide sufficient system capacity for running an accumulated extra workload of the new application and the additional diagnostic tests required to verify the deployment of said one or more diagnostic tests.

* * * * *